(12) United States Patent
Chen et al.

(10) Patent No.: US 6,333,816 B1
(45) Date of Patent: Dec. 25, 2001

(54) APPARATUS CAPABLE OF OPERATING AS INTERLEAVER/DEINTERLEAVERS OR FILTERS

(75) Inventors: Jye-Hong Chen, San Jose; Kok-Wai Chang, Los Altos; Kuochou Tai, Fremont; Hong-Wei Mao, San Jose; Yong Yin, Fremont, all of CA (US)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 09/518,561

(22) Filed: Mar. 3, 2000

(51) Int. Cl.$^7$ ...................................... G02B 5/30
(52) U.S. Cl. ........................ 359/497; 359/484; 359/127
(58) Field of Search ................................. 359/484, 494, 359/497, 124, 127

(56) References Cited

U.S. PATENT DOCUMENTS

| | | |
|---|---|---|
| 4,464,022 | 8/1984 | Emkey . |
| 4,474,434 | 10/1984 | Carlsen et al. . |
| 4,474,435 | 10/1984 | Carlsen et al. . |
| 4,514,046 | 4/1985 | Carlsen et al. . |
| 4,566,761 | 1/1986 | Carlsen et al. . |
| 4,685,773 | 8/1987 | Carlsen et al. . |

(List continued on next page.)

OTHER PUBLICATIONS

Amnon Yariv and Pochi Yeh, "Jones Calculus and its Application to birefringent Optical Systems." Optical Waves in Crystals, Propogation and Control of Laser Radiation, 1984, pp. 121–155, John Wiley & Sons, Inc., USA.

E.O. Ammann, "Synthesis of Optical Birefringent Networks", Progress in Optics, 1971, pp. 123–177, vol. IX, North–Holland Publishing Company, Amsterdam.

Shaoping Bian, Kebin Xu, & Jing Hong, "Optical Perfect Shuffle Using Wollaston Prisms", Applied Optics, Jan. 10, 1991; pp. 173–174, vol. 30, No. 2, USA.

Jack L. Jewell, S.L. McCall, Y.H. Lee, A. Scherer, A.C. Gossard, & J.H. English, "Optical Computing and Related Microoptic Devices", Applied Optics, Dec. 1, 1990, pp. 5050–5053, vol. 29, No. 34, USA.

Miles Murdocca, "Connection Routing for Microoptic Systems", Applied Optics, Mar. 10, 1990, pp. 1106–1110, vol. 29, No. 8, USA.

Kazuhiro Noguchi, Toshikazu Sakano, & Takao Matsumoto, "A Rearrangeable Multichannel Free–Space Optical Switch Based on Multistage Network Configuration", Journal of Lightwave Technology, Dec. 1991, pp. 1726–1732, vol. 9, No. 12, USA.

K. Shiraishi, T. Sato, & S. Kawakami, "Experimental Verification of a Form–Birefringent Polarization Splitter", Applied Physics Letters, Jan. 21, 1991, pp. 211–212, vol. 58, No. 3, USA.

(List continued on next page.)

Primary Examiner—Darren Schuberg
(74) Attorney, Agent, or Firm—Randy W. Lacasse; Kevin E. Greene; Lacasse & Associates (57) ABSTRACT

An apparatus capable of operating as an interleaver, a deinterleaver, a filter, or some combination thereof is described. An optical device that can be configured to multiple different optical components. In one embodiment, the optical device can be configured to operate as a single double-pass interlayer/deinterleaver, as two single-pass interleaver/deinterleavers, or as one or more filters. In one embodiment, the optical device has ports on two or more planes and a birefringent element that occupies the two or more planes. Connections between the two or more planes can be made by walk-off crystals internal to the optical device or between ports by connections that are external to the optical device to configure the optical device.

19 Claims, 10 Drawing Sheets

U.S. PATENT DOCUMENTS

| | | |
|---|---|---|
| 5,204,771 | 4/1993 | Koga . |
| 5,471,340 | 11/1995 | Cheng et al. . |
| 5,488,500 | 1/1996 | Glance . |
| 5,611,004 | 3/1997 | Chang et al. . |
| 5,694,233 | 12/1997 | Wu et al. . |
| 5,712,717 | 1/1998 | Hamel et al. . |
| 5,724,165 | 3/1998 | Wu . |
| 5,737,104 | 4/1998 | Lee et al. . |
| 5,764,825 | 6/1998 | Mugino et al. . |
| 5,778,118 | 7/1998 | Sridhar . |
| 5,808,763 | 9/1998 | Duck et al. . |
| 5,822,095 | 10/1998 | Taga et al. . |
| 5,835,517 | 11/1998 | Jayaraman et al. . |
| 5,852,505 | 12/1998 | Li . |
| 5,867,291 | 2/1999 | Wu et al. . |
| 5,915,051 | 6/1999 | Damask et al. . |
| 5,926,587 | 7/1999 | Chen et al. . |
| 5,930,039 | 7/1999 | Li et al. . |
| 5,974,205 | 10/1999 | Chang . |
| 6,002,503 | 12/1999 | Mizrahi . |
| 6,061,484 | 5/2000 | Jones et al. . |
| 6,111,695 * | 8/2000 | Lee et al. .............................. 359/484 |
| 6,154,581 * | 11/2000 | Lu et al. .............................. 359/484 |
| 2001/0000131 * | 4/2001 | Cao ..................................... 359/494 |

OTHER PUBLICATIONS

Masataka Shirasaki & Kunihiko Asama, "Compact Optical Isolator for Fibers Using Birefringent Wedges", Applied Optics, Dec. 1, 1982, pp. 4296–4299, vol. 21, No. 23, USA.

E. O. Ammann, "Synthesis of Electro–Optic Shutters having a Prescribed Transmission vs Voltage Characteristic", Journal of the Optical Society of America, Aug. 1966, pp. 1081–1088, vol. 56, No. 8, USA.

S.E. Harris, E. O. Ammann & I.C. Chang, "Optical Network Synthesis Using Birefringent Crystals", Journal of the Optical Society of America, Oct. 1964, pp. 1267–1279, vol. 54, No. 10, USA.

Benjamin B. Dingel & Masayuki Izutsu, "Multifunction Optical Filter with a Michelson–Gires–Tournois Interferometer for Wavelength–Division–Multiplexed Network System Applications", Optics Letters: Jul. 15, 1998; pp. 1099–1101, vol. 23, No. 14, Optical Society of America, USA.

Benjamin B. Dingel & Tadashi Aruga, "Properties of a Novel Noncascaded Type, Easy–to–Design, Ripple–Free Optical Bandpass Filter", Journal of Lightwave Technology, Aug. 1999, pp. 1461–1469, vol. 17, No. 8, USA.

* cited by examiner

APPARATUS CAPABLE OF OPERATING AS INTERLEAVER/DEINTERLEAVERS OR FILTERS

FIELD OF THE INVENTION

The invention relates to optical devices. More particularly, the invention relates to an optical device that is capable of operating as one or more interleaver/deinterleavers and/or as one or more filters, based at least in part on port configuration, by providing multiple layers of optical paths.

BACKGROUND OF THE INVENTION

As telecommunications usage increases as a result of, for example, increased Internet usage, increased types of communications and population growth, telecommunications providers are required to provide greater voice- and data-carrying capacity. In order to reduce cost and the amount of time required to provide the increased capacity wavelength division multiplexing (WDM) and dense wavelength division multiplexing (DWDM) have been developed, which provide increased capacity without requiring new fiber optic cables.

WDM and DWDM technologies combine multiple optical signals into a single fiber by transporting different signals on different optical wavelengths or channels. Interleaving and deinterleaving of optical channels is typically accomplished with thin film optical filters. However, multiple layers of film are required to interleave and deinterleave multiple channels, which increases the cost and complexity of a component. Another disadvantage of multiple layers of thin film for filtering is that the thin films break down over time, especially when operating under high power conditions.

In addition to requiring interleavers and/or deinterleavers, filters are often required to filter optical signals at various locations within a network. As channel spacing becomes smaller, the transmission capacity of the network increases and the passbands of the interleaver/deinterleavers and filters decrease. Because interleavers, deinterleavers and filters are common optical network components, it is desirable to have an optical device that is capable of operating as an interleaver, a deinterleaver, a filter or some combination of interleaver, deinterleaver and filter.

SUMMARY OF THE INVENTION

An apparatus capable of operating as an interleaver, a deinterleaver, a filter, or some combination thereof is described. The apparatus includes a birefringent element, a ports oriented on at least two decks, reflective elements to reflect optical signals through the birefringent element, and half wave plates positioned between one or more of the ports and the birefringent element and between one or more of the reflective elements and the birefringent element. When the apparatus is in a first configuration, the apparatus operates as at least one filter and when the apparatus is in a second configuration, the apparatus operates as at least one interleaver/deinterleaver.

BRIEF DESCRIPTION OF THE DRAWINGS

The invention is illustrated by way of example, and not by way of limitation in the figures of the accompanying drawings in which like reference numerals refer to similar elements.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

An optical device that can be configured for multiple different functionalities. In one embodiment, the optical device can be configured to operate as a single double-pass interleaver/deinterleaver, as two single-pass interleaver/deinterleavers, or as one or more filters. In one embodiment, the optical device has ports on two or more planes and a birefringent element that occupies the two or more planes. Connections between the two or more planes can be made by walk-off crystals internal to the optical device or between ports by connections that are external to the optical device to configure the optical device. The optical device is described herein as having two planes of optical paths; however, any number of planes can be provided.

Figure 1:
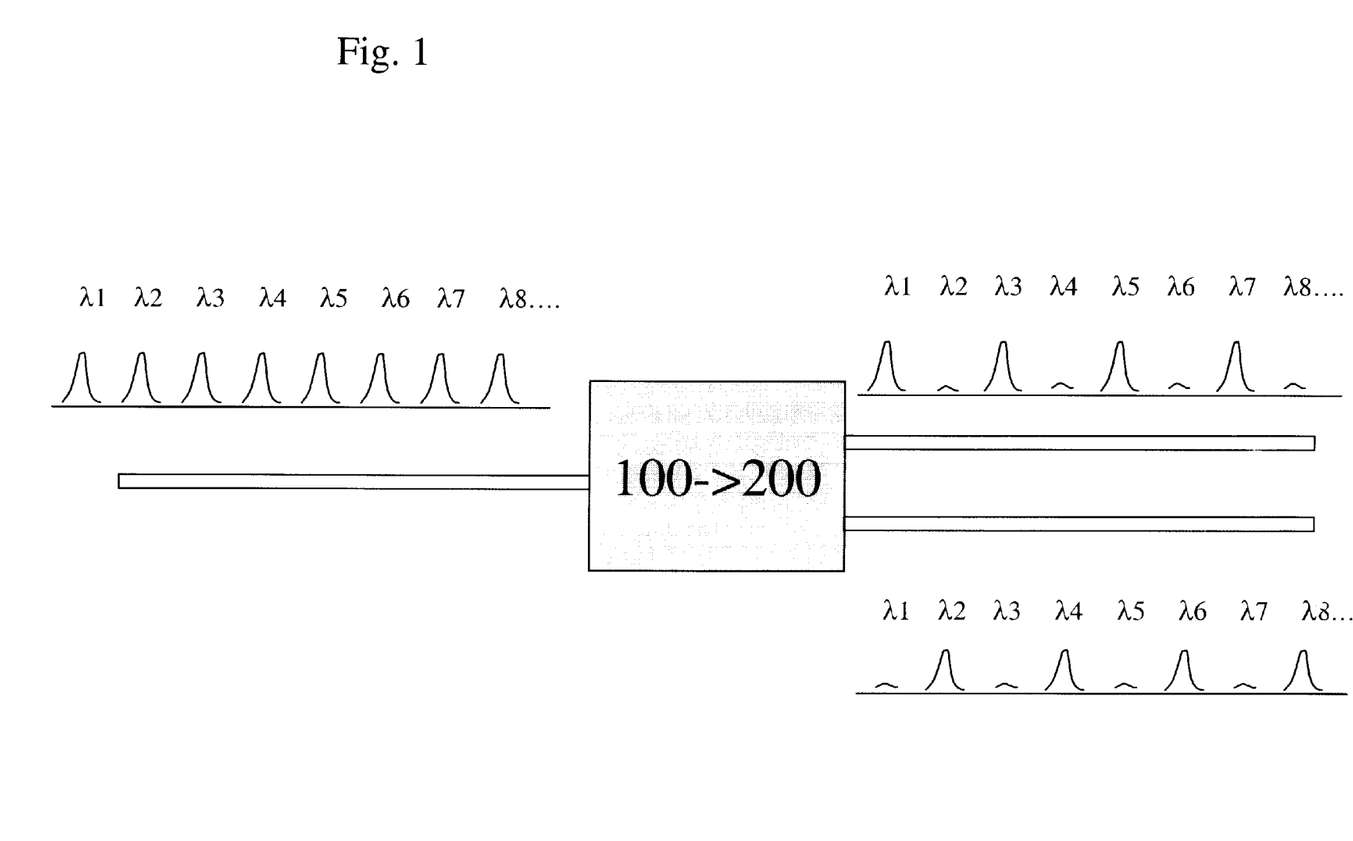
FIG. 1 is a conceptual illustration of a conversion from an optical channel scheme having 100 GHz spacing to an optical channel scheme having 200 GHz.

FIG. 1 is a conceptual illustration of a conversion from an optical channel scheme having 100 GHz spacing to an optical channel scheme having 200 GHz. The conversion of FIG. 1 is useful, for example, to allow devices designed to operate with an optical channel scheme having 200 GHz channel spacing to interact with other devices or a network designed to operate with an optical channel scheme having 100 GHz channel spacing. Conversion between 100 GHz channel spacing and 200 GHz channel spacing allows, for example, network bandwidth to be increased without upgrading all of the devices that interact with the network.

In one embodiment, the converter of FIG. 1 is a deinterleaver that separates an optical signal having even and odd channels (e.g., ITU channels) into a first optical signal including the even channels and a second optical signal including the odd channels. After the signals are deinterleaved, the odd channels have a 200 GHz spacing and the even channels have a 200 GHz spacing. Recombining the even and the odd channels into a single signal can be accomplished with an interleaver. In other words, the even and odd channels having 200 GHz spacing can be combined (interleaved) into an optical signal having 100 GHz signal spacing. Similar interleaving can be provided to convert between 100 GHz spaced channels and 50 GHz spaced channels, as well as between other sets of channel spacing schemes.

Figure 2:
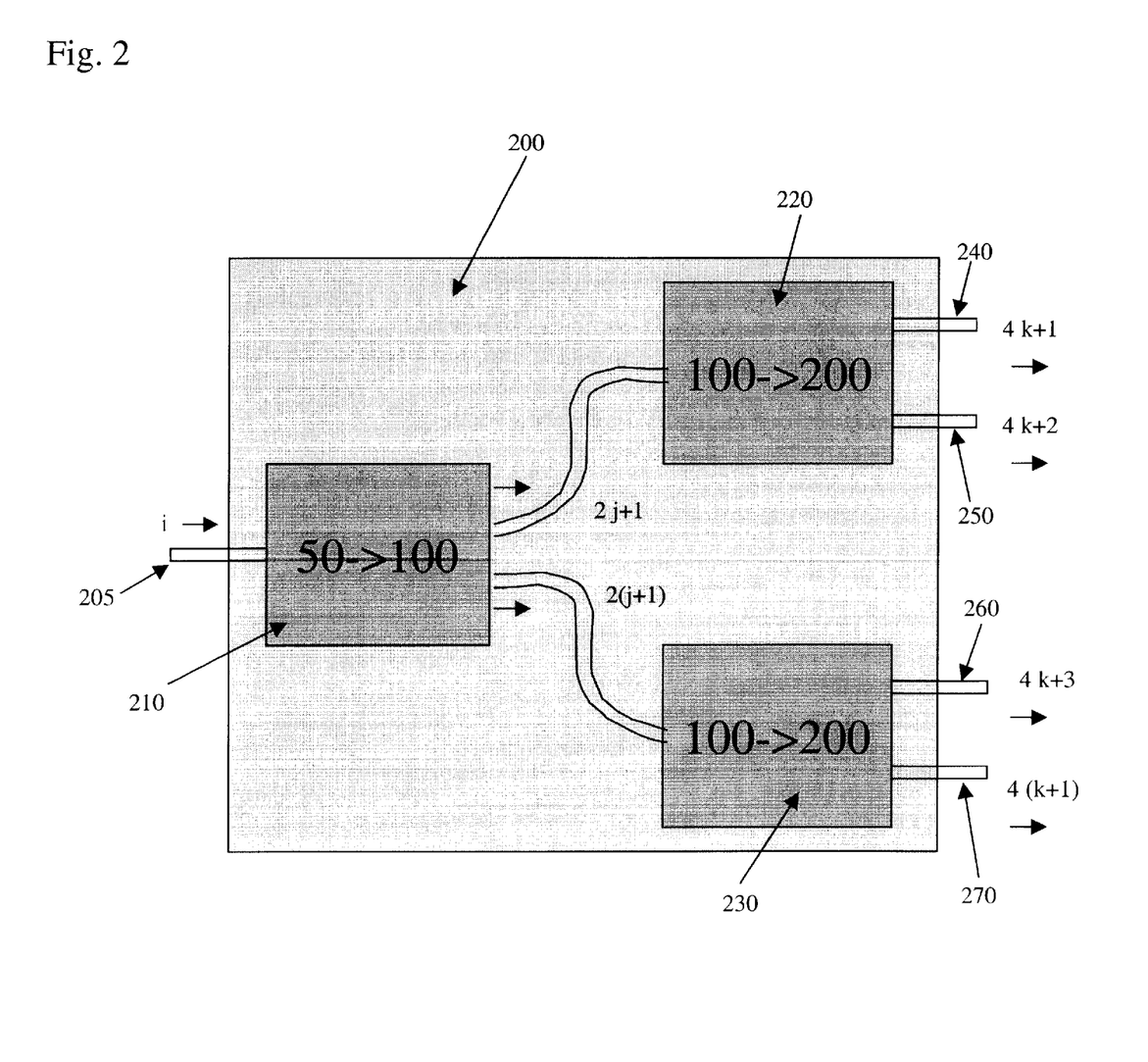
FIG. 2 is a block diagram of one embodiment of an optical deinterleaver for conversion from an optical channel scheme having 50 GHz spacing to an optical channel scheme having 200 GHz spacing.

FIG. 2 is a block diagram of one embodiment of an optical deinterleaver for conversion from an optical channel scheme having 50 GHz spacing to an optical channel scheme having 200 GHz spacing. In general, deinterleaver 200 includes deinterleaver 210 to convert from one set of 50 GHz spaced channels to two sets of 100 GHz spaced channels. Deinterleaver 200 also includes two deinterleavers (220 and 230) each of which convert one of the sets of 100 GHz spaced channels to two sets of 200 GHz spaced channels. Deinterleaver 200 allows devices designed for 200 GHz spaced channels to interact with devices or networks designed for 50 GHz spaced channels.

Optical fiber 205 carries a set of optical channels, i, having 50 GHz spacing. Deinterleaver 210 separates the set of optical channels into sets of even, 2(j+1), and odd, 2j+1, channels. The even channels are input to deinterleaver 230 and the odd channels are input deinterleaver 220. The even and the odd channels have 100 GHz spacing.

Deinterleavers 220 and 230 operate to further separate the set of optical channels. Conceptually, deinterleaver 220 and 230 operate on the respective 100 GHz spaced channels to separate the input channels into "even" and "odd" channels. The sets of channels output by deinterleavers 220 and 230 have 200 GHz spacing.

Deinterleaver 220 separates the odd channels into two sets of channels, odd—odd channels, 4k+1, output by optical fiber 240 and odd-even, 4k+2, channels output by optical fiber 250. Deinterleaver 230 separates the even channels into two sets of channels, the even-odd, 4k+3, channels output by optical fiber 260 and the even—even, 4(k+1), channels output by optical fiber 270.

The four sets of channels output by deinterleaver 200 are 200 GHz spaced channels. Thus, deinterleaver 200 can be used to interface one or more devices designed to operate on 200 GHz spaced channels with one or more devices or networks designed to operate on 50 GHz spaced channels. Other channel spacings can also be supported.

Figure 3:
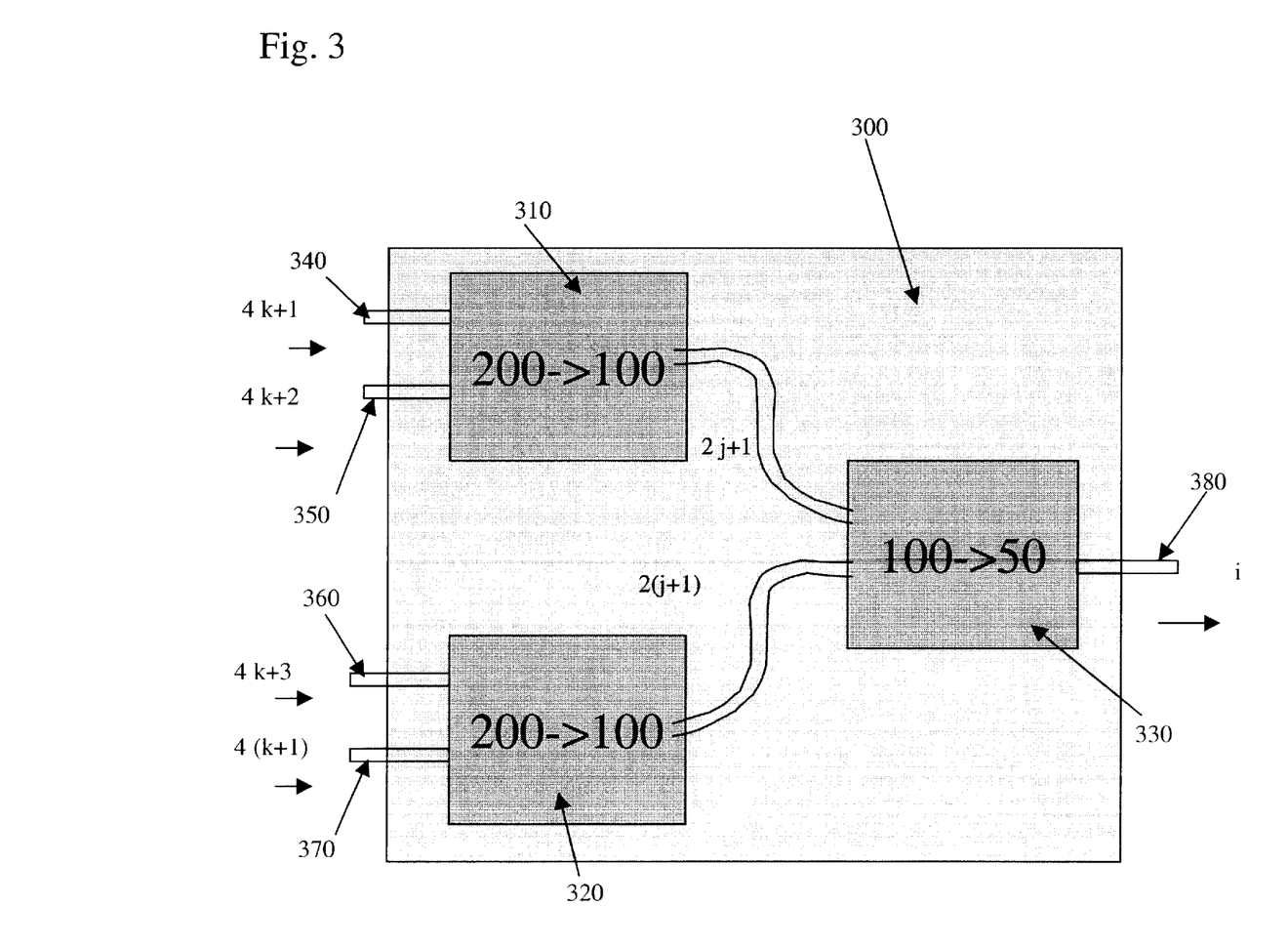
FIG. 3 is a block diagram of one embodiment of an optical interleaver for conversion from an optical channel scheme having 200 GHz spacing to an optical channel scheme having 50 GHz spacing.

FIG. 3 is a block diagram of one embodiment of an optical interleaver for conversion from an optical channel scheme having 200 GHz spacing to an optical channel scheme having 50 GHz spacing. In general, interleaver 300 includes interleaver 310 to convert from two sets of 200 GHz spaced channels to one set of 100 GHz spaced channels. Similarly, interleaver 320 converts from two sets of 200 GHz spaced channels to one set of 100 GHz channels. Interleaver 330 converts the two sets of 100 GHz spaced channels to one set of 50 GHz spaced channels. Interleaver 300 allows devices designed for 200 GHz spaced channels to interact with devices or networks designed for 50 GHz spaced channels.

The odd—odd, 4k+1, channels having 200 GHz spacing are input to interleaver 310 via optical fiber 340. The odd-even, 4k+2, channels having 200 GHz spacing are input to interleaver 310 via optical fiber 350. Interleaver 310 interleaves the odd-odd channels and the odd-even channels to generate a set of odd, 2j+1, channels having 100 GHz spacing.

The even-odd, 4k+3, channels having 200 GHz spacing are input to interleaver 320 via optical fiber 360. The even—even, 4(k+1), channels having 200 GHz spacing are input to interleaver 320 via optical fiber 370. Interleaver 320 interleaves the even-odd channels and the even—even channels to generate a set of even, 2(j+1), channels having 100 GHz spacing.

Interleaver 330 interleaves the even and odd channels to generate a set of channels, i, having 50 GHz spacing. Thus, interleaver 300 allows devices designed to operate on optical channels having 200 GHz spacing to interact with devices designed to operate on optical channels having 50 GHz spacing. Other channels spacings can also be supported.

Figure 4:
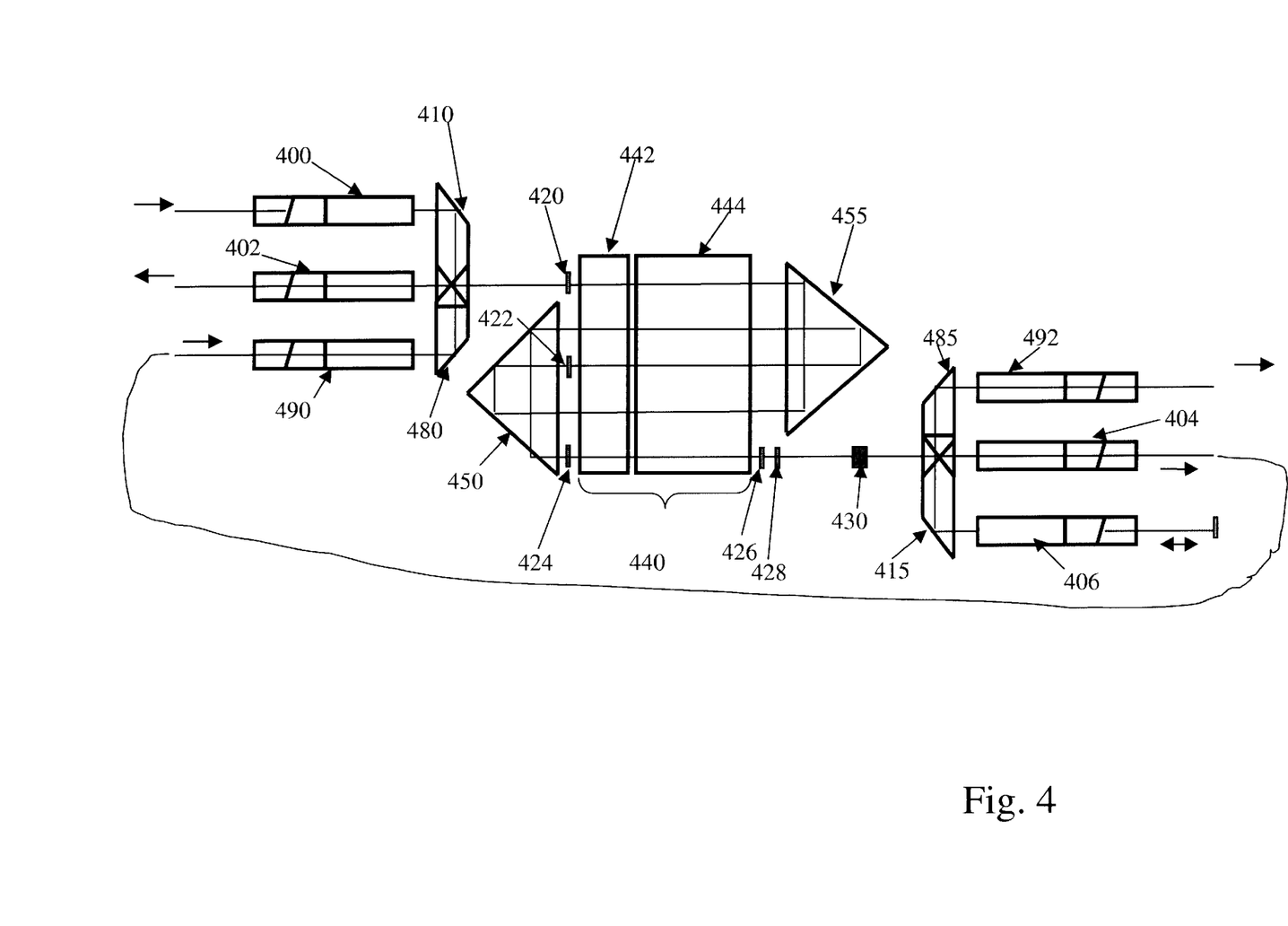
FIG. 4 is a top view of one embodiment of an optical device configured to operate as a double-pass optical interleaver/deinterleaver.

FIG. 4 is a top view of one embodiment of an optical device configured to operate as a double-pass optical interleaver/deinterleaver. The optical device of FIG. 4 is useful, for example, with DWDM systems having channel spacings of 50 GHz or less. The optical device of FIG. 4 has two "layers" of optical ports referred to as an "upper deck" and a "lower deck." In alternate embodiments, more than two layers can be provided. In one embodiment a birefringent element, half wave plates, Faraday rotators and/or polarizers span both decks. Some of these sub-components can, however, be limited to one deck.

As a brief summary of interleaver operation of the optical device of FIG. 4, an optical signal including even and odd channels having a known frequency spacing (e.g., 50 GHz between channels), or free spectral range, is received via port 400. The signal is passed through multiple half wave plates and birefringent element 440, which separates the signal into even and odd channels having different polarizations. In one embodiment, odd channels are directed to port 404 and even channels are directed to port 406 by a walk-off crystal. At this point, channels having close channel spacings (e.g., 50 GHz or less) may not isolated enough for use by other optical devices.

In one embodiment, the odd channels are routed to port 490 for a second pass through the optical device on a different deck than the first pass through the optical device. In one embodiment, the even channels are reflected back though the optical device from port 406. In alternate embodiments, the paths of the even and odd channel ports can be reversed. The second pass through the optical device further filters the even and odd channels to provide better isolation than would be provided by a single pass. In one embodiment, after the second pass through the optical device, the even channels are output via port 492 and the odd channels are output via port 402. In alternate embodiments, the even and odd output ports can be reversed. Also, other types (other than ITU even and odd channels) of optical signals can be interleaved and deinterleaved.

In one embodiment, when the optical device is used as a deinterleaver, a set of odd channels is received via port 402 and a set of even channels is received via port 492. The even and odd channels are passed through the optical device in the reverse of the interleaving configuration described above. An optical signal including the even and the odd channels is output via port 400.

Figure 5:
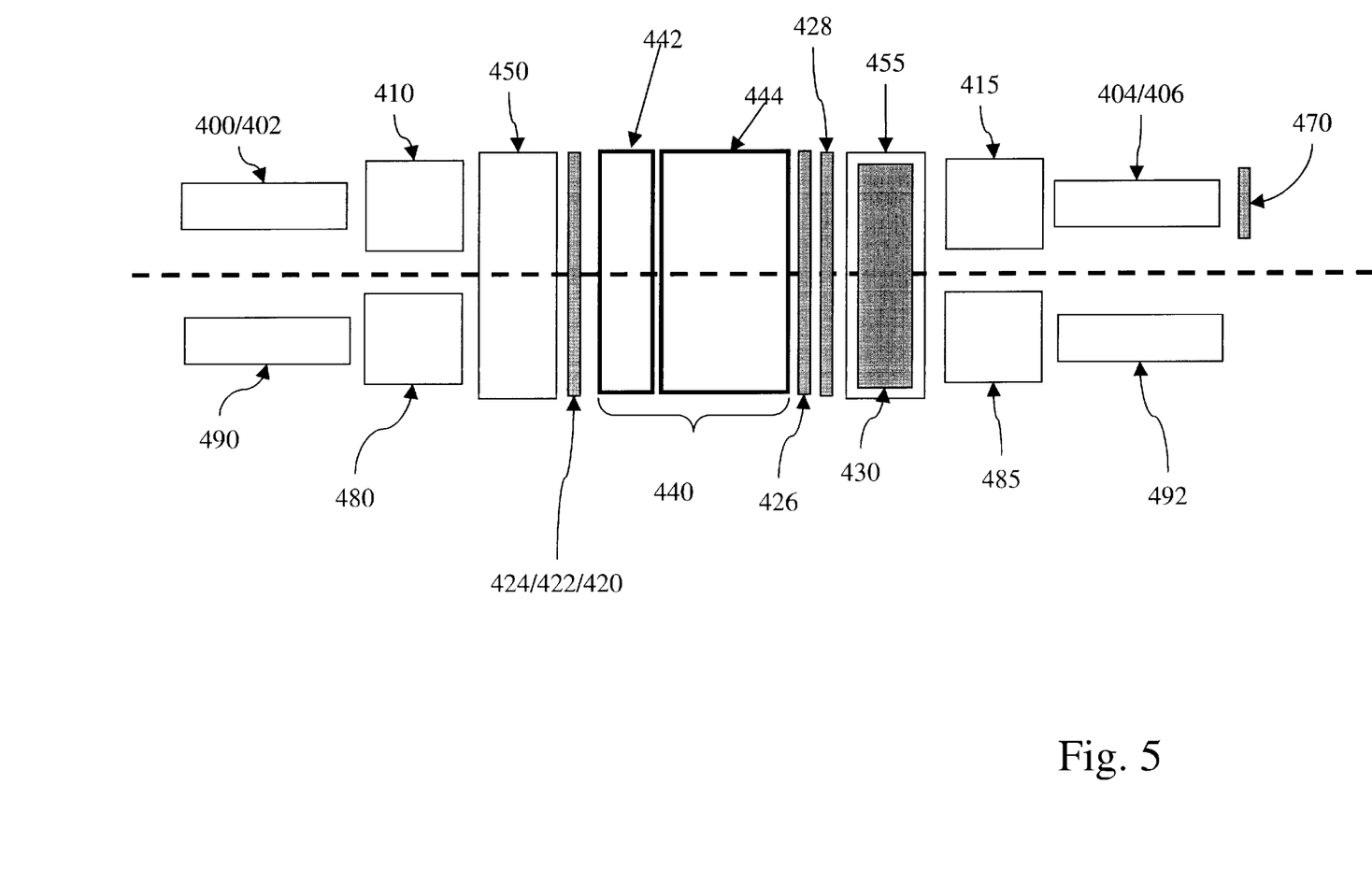
FIG. 5 is a side view of the optical device of FIG. 4.

In FIG. 4, the arrows correspond to an interleaver configuration. In one embodiment, ports 400, 402, 404 and 406 are in a first plane, or layer, which with respect to FIG. 4, is referred to as the upper deck. Ports 490 and 492 are in a second plane, or layer, which with respect to FIG. 4, is referred to as the lower deck. The upper and lower decks can be reversed and other configurations having an upper and a lower deck can also be implemented to provide and interleaver/deinterleaver. A side view of the "double-decker" orientation of the optical device is illustrated in FIG. 5 below.

While a single double-decker interleaver/deinterleaver device is described with respect to FIG. 4, a single birefringent element can provide the core for multiple double decker interleave/deinterleaver devices as well as one or more filters. Optical filters that can be provided with the birefringent element described herein are described in greater detail below. In one embodiment, the physical device implementation that provides the interleaver/deinterleaver of FIG. 4 includes two additional ports and two additional walk off crystals that are not used in the double-pass interleaver/deinterleaver configuration. The unused ports and walk-off crystals are omitted from FIG. 4 for reasons of simplicity, but are included in FIG. 6 below.

An optical signal is received through port 400. In one embodiment, port 400 is a collimator assembly having a gradient index (GRIN) lens to collimate the light. Other types of lenses can also be used, or pre-collimated light can be received. In the embodiment of FIG. 4, port 400 receives the optical signal via an optical fiber and collimates the optical signal with the GRIN lens.

In one embodiment, the optical signal is offset by walk-off crystal 410, which is in the upper deck. The optical signal is then passed through polarizer 420. In one embodiment, polarizer 420 provides polarization in the range of 0° to 15° (e.g., 2.6°) for optical signals passing from walk-off crystal 410 to birefringent element 420; however, other polarizations can be used with appropriate changes to the azimuth angles of one or more other half wave plates.

After passing through half wave plate 420, the optical signal is directed to birefringent element 440. In one embodiment, birefringent element 440 is composed of crystals 442 and 444 that are selected to provide improved thermal stability over a range of operating temperatures as compared to a single birefringent crystal. In one embodiment, crystal 442 is a $TiO_2$ crystal having a thickness of 2 mm, and crystal 444 is a $YVO_4$ crystal having a thickness of 9.5 mm. Other birefringent assemblies can also be used, for example, a single crystal can be used if temperature stability is not important, or other multi-crystal birefringent assemblies can be used.

After passing through birefringent element 440, the optical signal is reflected by reflective element 455. In one embodiment, reflective element 455 is a 90° reflecting crystal; however, other reflective elements can be used based on, for example, the physical layout of the interleaver/deinterleaver. In one embodiment, the face(s) through which the optical signal is received and/or reflected has a low-order compensator component to compensate for phase shift in the respective crystals. In alternate embodiments, the low-order compensator can be omitted.

The optical signal is reflected by reflective element 455 back through birefringent element 440. The optical signal is then reflected by reflective element 450 through half wave plate 422 and through birefringent element 440. In one embodiment, reflective element 450 is a 90° reflecting crystal; however, other reflective elements can be used based on, for example, the physical layout of the interleaver/deinterleaver. In one embodiment, the face(s) through which the optical signal is received and/or reflected has a low-order compensator component to compensate for phase shift in the respective crystals. In one embodiment, half wave plate 422 is oriented with an azimuth angle in the range of 0° to −15° (e.g., −6.5°); however, the azimuth angle can be different with appropriate changes to the azimuth angles of one or more other half wave plates.

After passing through half wave plate 422, the optical signal passes through birefringent element 440 back to reflective element 455. Reflective element 455 reflects the optical signal back through birefringent element 440 to reflective element 450. Reflective element 450 reflects the optical signal through half wave plate 424 and birefringent element 440.

In one embodiment, half wave plate 422 is oriented with an azimuth angle in the range of 0° to −15° (e.g., −6.5°) for optical signals passing from birefringent element 420 to reflective element 450; however, the azimuth angle can be different with appropriate changes to the azimuth angles of one or more other half wave plates. The optical signal then passes through birefringent element 440, half wave plate 426 and half wave plate 428. In one embodiment, half wave plates 426 and 428 have azimuth angles of 22.5° and 22.5°, respectively; however, other azimuth angles can also be used.

The optical signal then passes through Faraday rotator 430. Faraday rotator rotates the polarizations of the optical signals 90° when the signals pass through the Faraday rotator in one direction and does not rotate the polarization of the optical signals when the optical signals pass through in the reverse direction. For example, when optical signals pass through Faraday rotator 430 from left to right in the device as illustrated in FIG. 4, the optical signals are rotated 90°. When optical signals are reflected to pass through Faraday rotator 430 from left to right, the optical signals are not rotated.

At this point the even channels have a first polarization (e.g., horizontal) and the odd channels have a different polarization (e.g., vertical). In one embodiment, walk-off crystal 415 passes the odd channels to port 404 and offsets the even channels to port 406. In one embodiment port 404 is optically coupled to port 490 (e.g., by a fiber jumper) and quarter wave mirror 470 is oriented to reflect the even channels back through port 406. In alternative embodiments, the odd channels can be reflected and the even channels can be routed to another port.

The reflected even channels follow the reverse of the optical path described through the upper deck except that walk-off crystal 410 passes the even channels to port 402 rather than offsetting the even channels to port 400. The odd channels are routed to port 490, which is part of the lower deck. The odd channels are received by port 490 and are offset by walk-off crystal 480 and follow an optical path that is parallel to, but, in one embodiment, below the optical path described above. In other words, the odd channels follow the similar optical path (e.g., through half wave plate 420, birefringent element 440 . . . to half wave plates 426 and 428) in the lower deck, rather than in the upper deck as described above. After the odd channels pass through Faraday rotator 430, the odd channels are offset by walk-off crystal 485 to port 492.

Thus, by placing a quarter wave mirror at the output of port 406 and by coupling port 404 to port 490 the optical device of FIG. 4 can be configured to operate as a double pass interleaver/deinterleaver. As described in greater detail below, Other configurations of the same device can provide different functionality, for example, two single pass interleaver/deinterleavers (e.g., for use with channel spacing greater than 50 GHz), or multiple comb filters.

FIG. 5 is a side view of the optical device of FIG. 4. The dashed line in FIG. 5 illustrates a distinction between the upper deck and the lower deck of the optical device. For reasons of simplicity, the optical paths are not illustrated in FIG. 5 and the jumper illustrated in FIG. 4 is not illustrated in FIG. 5. Multiple reference numbers separated by a "/" indicates that one or more elements is obscured by another element. For example, the port labeled "400/402" indicates that port 402 is directly behind port 400 from the side view illustrated in FIG. 5.

Figure 6:
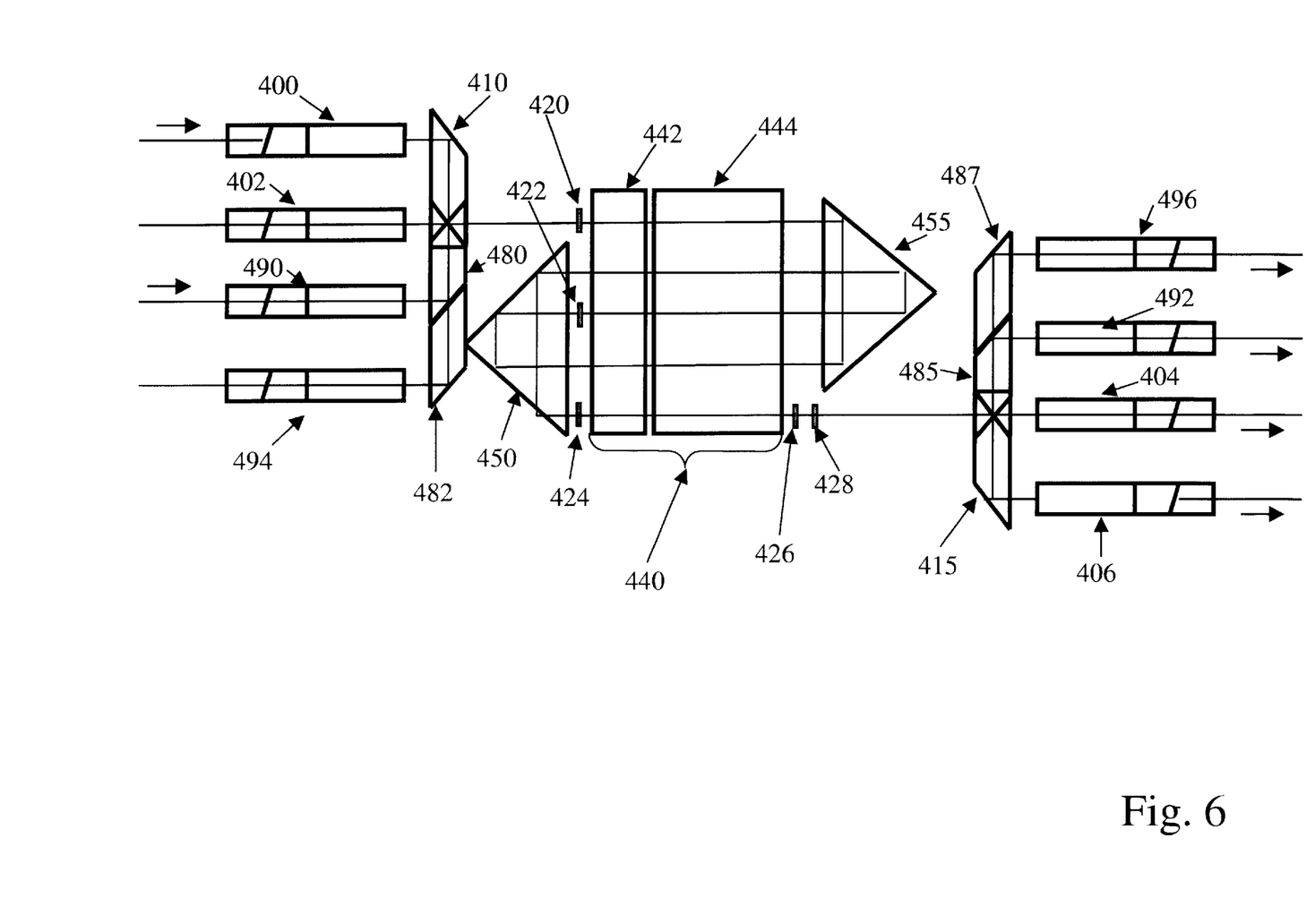
FIG. 6 is a top view of the optical device of FIG. 4 configured to operate as two single-pass optical interleaver/deinterleavers.

FIG. 6 is a top view of the optical device of FIG. 4 configured to operate as two single-pass optical interleaver/deinterleavers rather than a single double-pass interleaver/deinterleaver as illustrated in FIG. 4. In one embodiment, the additional components illustrated in FIG. 6 that are not illustrated in FIG. 4 (i.e., port 494, walk-off crystal 482, port 496 and walk-off crystal 487) are part of the lower deck. Alternative configurations can also be used. In one embodiment, when operating as two single pass interleaver/deinterleavers, the device of FIG. 6 receives two optical signals, one through port 400 and one through port 490. Both of the optical signals include even and odd channels.

For some channel spacings, for example, 200 GHz, the single pass interleaver/deinterleaver configuration of FIG. 6 provides sufficient channel isolation for use by other optical devices. When operating as a deinterleaver, the even channels from the optical signal received through port 400 are output from port 404. The odd channels are output from port 406. The even channels from the optical signal received through port 490 are output from port 494. The odd channels are output from port 492. Ports 402 and 494 are not used.

When operating as an interleaver, even channels are received through ports 404 and 496 and odd channels are received through ports 406 and 492. The signals are combined and output through ports 400 and 490. Ports 402 and 494 are not used. For the embodiment of FIG. 6, a first single-pass interleaver/deinterleaver is implemented by the upper deck and a second single-pass interleaver/deinterleaver is implemented by the lower deck.

Figure 7:
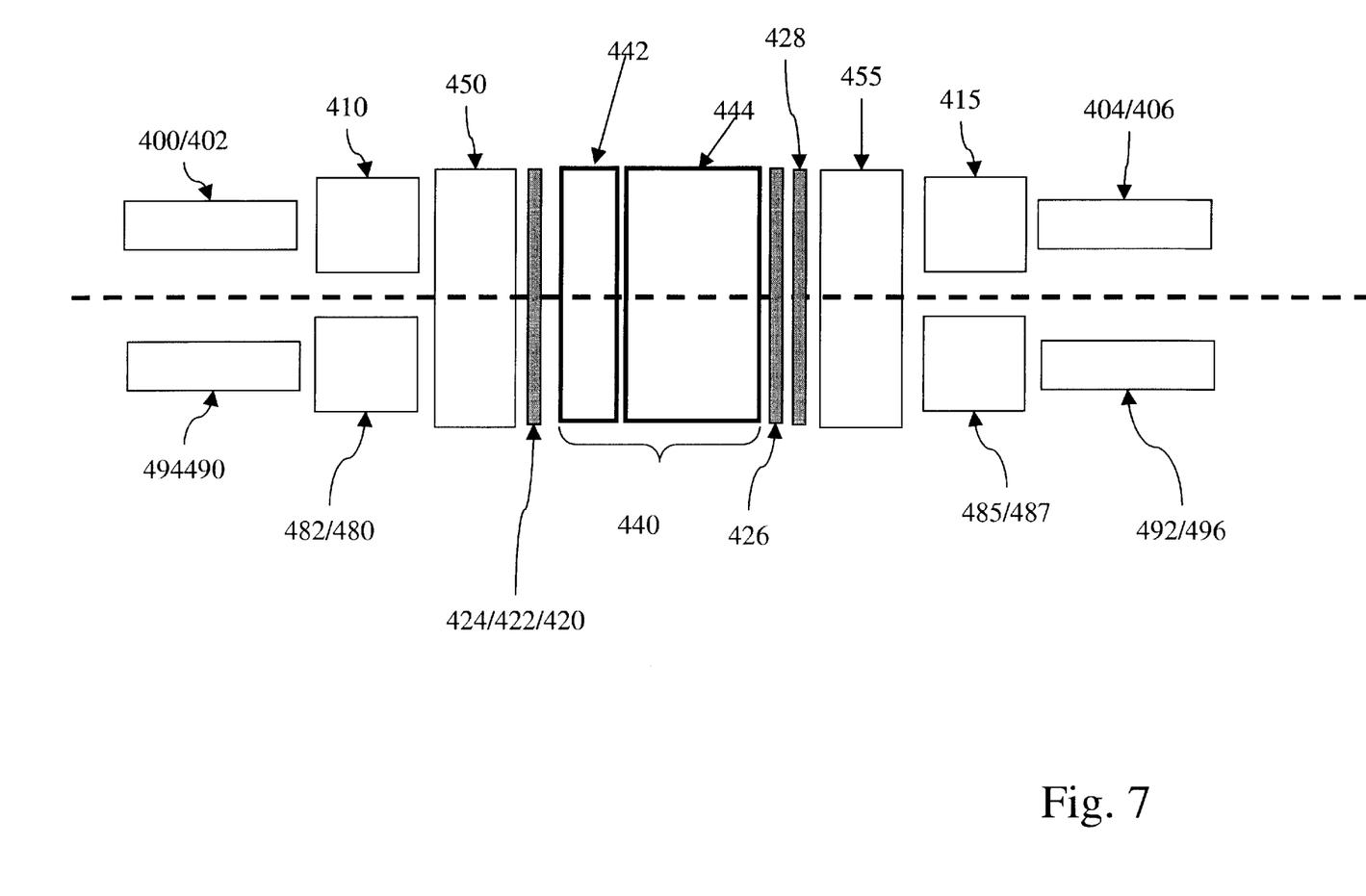
FIG. 7 is a side view of the optical device of FIG. 6.

FIG. 7 is a side view of the optical device of FIG. 6. The dashed line in FIG. 7 illustrates a distinction between the upper deck and the lower deck of the optical device. For reasons of simplicity, the optical paths are not illustrated in FIG. 7. The numbering convention of multiple reference numbers separated by a "/" used in FIG. 5 above is also used in FIG. 7.

Figure 8:
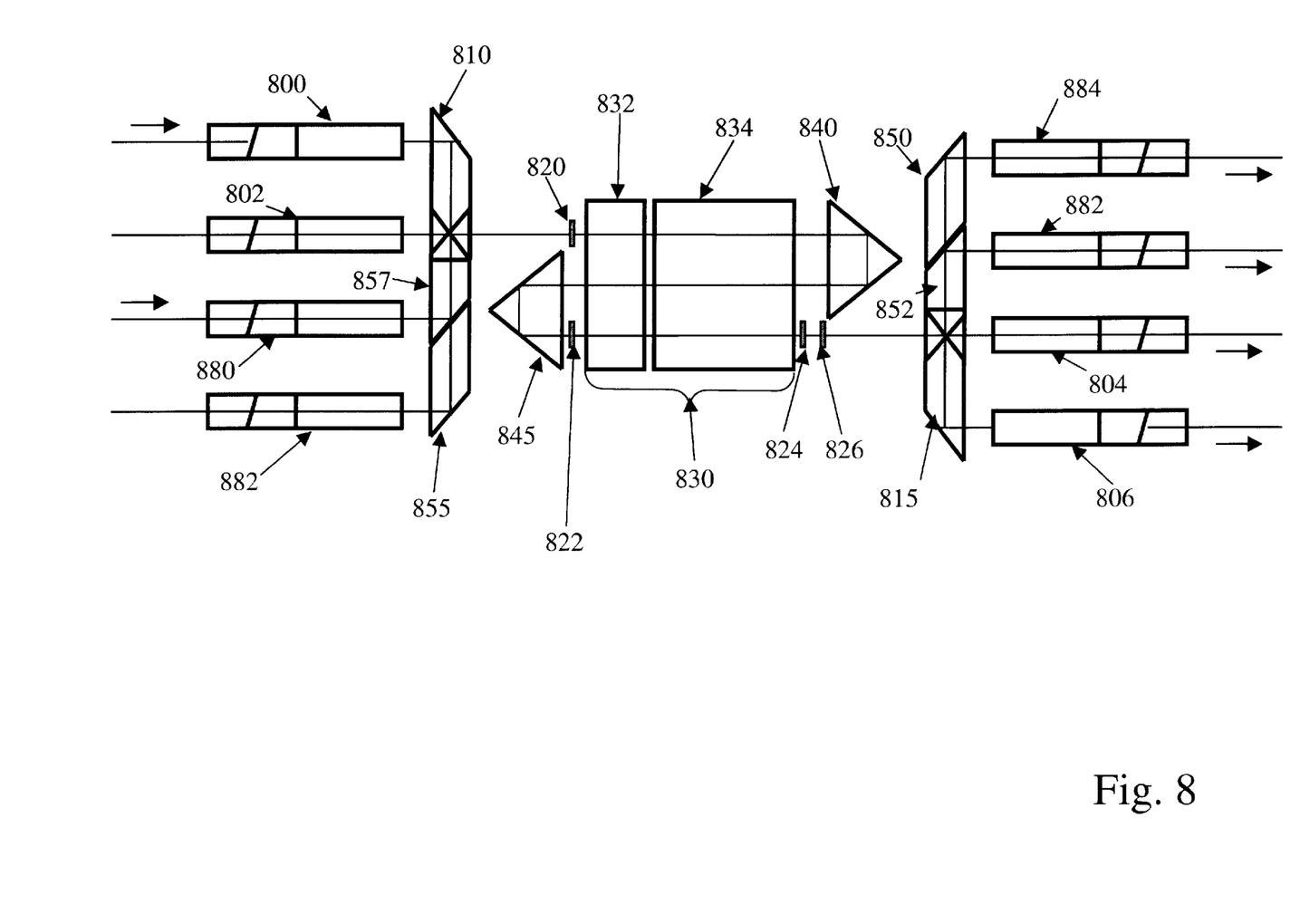
FIG. 8 is a top view of one embodiment of a double-decker optical device configured to operate as two single-pass interleaver/deinterleavers.

FIG. 8 is a top view of one embodiment of a double-decker optical device configured to operate as two single-pass interleaver/deinterleavers. In general, the upper deck of the device provides a first single-pass interleaver/deinterleaver and the lower deck provides a second single-pass interleaver/deinterleaver. Any number of decks, each providing a single-pass interleaver/deinterleaver can be implemented. In one embodiment, ports 802 and 882 are not used.

In one embodiment, a first optical signal having both even and odd channels is received by port 800 and a second optical signal having both even and odd channels is received by port 880. In one embodiment, ports 800 and 880 are collimator assemblies having GRIN lenses to collimate the light. Other types of lenses can also be used, or pre-collimated light can be received. In one embodiment, the optical signals received by ports 800 and 880 are vertically polarized.

The optical signals are then passed through half wave plate 820, which spans the upper and lower decks. In one embodiment, half wave plate 820 is oriented with an azimuth angle in the range of 0° to −15° (e.g., −6.5°) for optical signals passing from walk-off crystal 810 to birefringent element 830; however, the azimuth angle can be different with appropriate changes to the azimuth angles of one or more other half wave plates. Half wave plate 820 introduces a relative phase difference of 180° between the ordinary and extraordinary components of the optical signal.

After passing through half wave plate 820, the optical signal is directed to birefringent element 830, which also spans the upper and lower decks. In one embodiment, birefringent element 830 is composed of crystals 832 and 834 that are selected to provide improved thermal stability over a range of operating temperatures as compared to a single birefringent crystal. In one embodiment, crystal 832 is a $TiO_2$ crystal having a thickness of 2 mm, and crystal 834 is a $YVO_4$ crystal having a thickness of 9.5 mm. Other birefringent assemblies can also be used, for example, a single crystal can be used if temperature stability is not important, or other two-crystal birefringent assemblies can be used.

After passing through birefringent element 830, the optical signal is reflected by reflective element 840. In one embodiment, reflective element 840 is a 90° reflecting crystal; however, other reflective elements can be used based on, for example, the physical layout of the interleaver/deinterleaver. In one embodiment, the face(s) through which the optical signal is received and/or reflected has a low-order compensator component to compensate for phase shift in the respective crystals. If the reflective element does not cause a phase shift, low-order the compensator can be omitted.

The optical signal is reflected by reflective element 840 back through birefringent element 830. The optical signal is then reflected by reflective element 845 through half wave plate 822 and through birefringent element 830. In one embodiment, reflective element 845 is a 90° reflecting crystal; however, other reflective elements can be used based on, for example, the physical layout of the interleaver/deinterleaver. In one embodiment, the face(s) through which the optical signal is received and/or reflected has a low-order compensator component to compensate for phase shift in the respective crystals.

In one embodiment, half wave plate 822 is oriented with an azimuth angle in the range of 0° to −15° (e.g., −6.5°); however, the azimuth angle can be different with appropriate changes to the azimuth angles of one or more other half wave plates. The optical signal then passes through birefringent element 830, half wave plate 424 and half wave plate 426. In one embodiment, half wave plates 424 and 426 have azimuth angles of 22.5° and 22.5°, respectively; however, other azimuth angles can also be used.

In one embodiment, after passing through half wave plate 826, for both the upper and lower decks, the even channels are horizontally polarized and the odd channels are vertically polarized. In alternative embodiments, the odd channels are horizontally polarized and the even channels are vertically polarized. By using different half wave plates for the different decks, different polarizations can be used for different decks.

Walk-off crystals 815, 850 and 852 direct the even and odd channels to different ports based on polarization. In one embodiment, for the optical signal received through port 800, the even channels are output through port 804 and the even channels are output through port 806, and for the optical signal received through port 880, the even channels are output through port 884 and the odd channels are output through port 886. Other configurations can also be provided.

Figure 9:
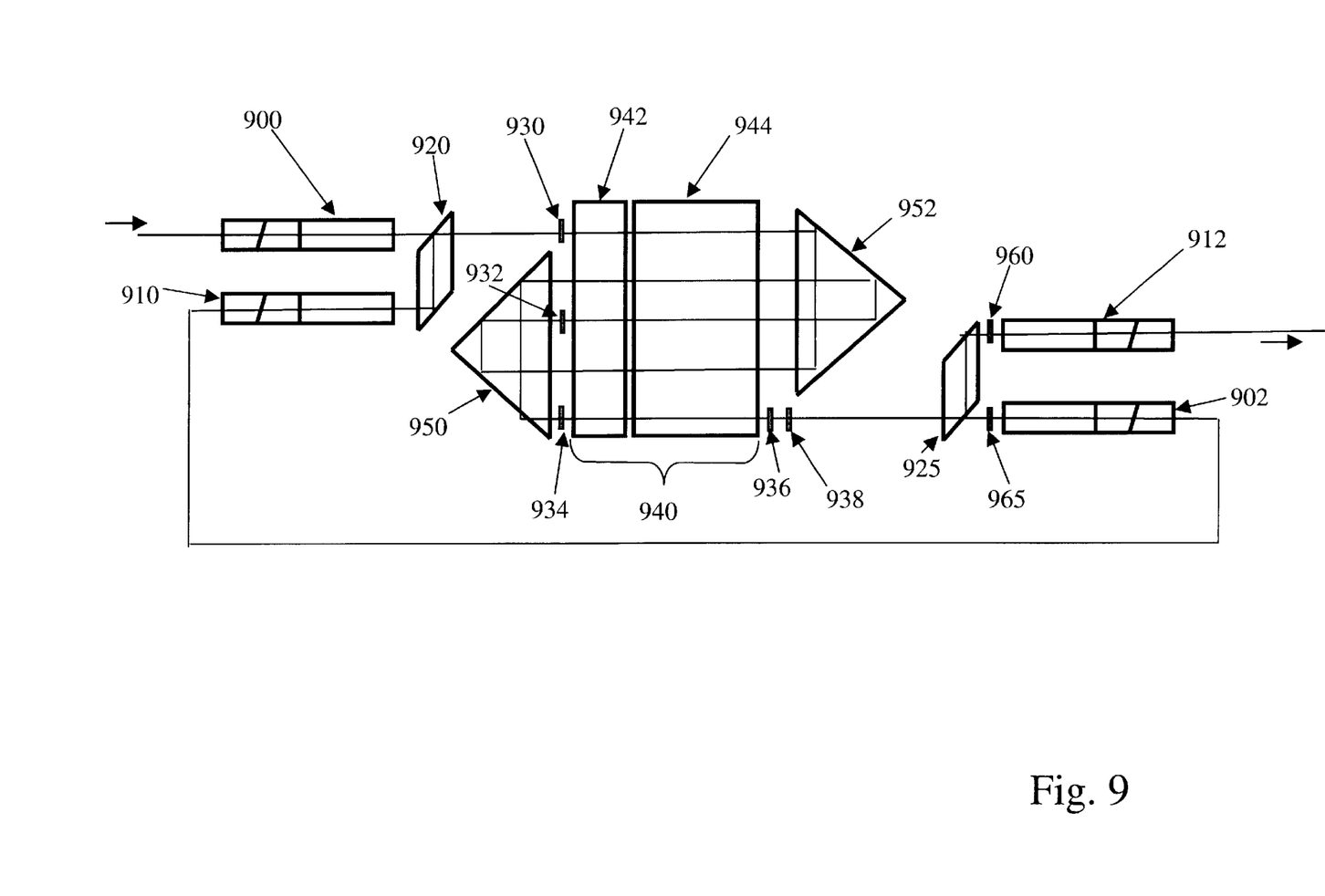
FIG. 9 is a top view of one embodiment of a double-decker optical device configured to operate as a double-pass filter.

FIG. 9 is a top view of one embodiment of a double-decker optical device configured to operate as a double-pass filter. The filter of FIG. 9 can be implemented using the optical devices described above by using the ports as described. In one embodiment, the upper deck is used for one pass through the device and the lower deck is used for another pass through the device, thus providing a double-pass filter. In one embodiment, ports 900 and 902 are part of the upper deck and ports 910 and 912 are part of the lower deck. Unused ports are not illustrated in FIG. 9 for reasons of simplicity.

In one embodiment an optical signal is received through port 900 and the output signal that is output from port 900 is vertically polarized. The vertically polarized signal is then passed through polarizer 930. In one embodiment, polarizer 930 provides polarization in the range of 0° to 15° (e.g., 2.60); however, the polarizations angle can be different with appropriate changes to the azimuth angles of one or more half wave plates.

After passing through polarizer 930, the optical signal is directed to birefringent element 940. In one embodiment, birefringent element 940 is composed of crystals 942 and 944 that are selected to provide improved thermal stability over a range of operating temperatures as compared to a single birefringent crystal. In one embodiment, crystal 942 is a $TiO_2$ crystal having a thickness of 2 mm, and crystal 944 is a $YVO_4$ crystal having a thickness of 9.5 mm. Other birefringent assemblies can also be used, for example, a single crystal can be used if temperature stability is not important, or other two-crystal birefringent assemblies can be used.

After passing through birefringent element 940, the optical signal is reflected by reflective element 952. In one embodiment, reflective element 952 is a 90° reflecting crystal; however, other reflective elements can be used based on, for example, the physical layout of the filter. In one embodiment, the face(s) through which the optical signal is received and/or reflected has a low-order compensator component to compensate for phase shift in the respective crystals. If the reflective element does not cause a phase shift, low-order the compensator can be omitted.

The optical signal is reflected by reflective element 952 back through birefringent element 940. The optical signal is then reflected by reflective element 950 through half wave plate 932 and through birefringent element 940. In one embodiment, reflective element 950 is a 90° reflecting crystal; however, other reflective elements can be used based on, for example, the physical layout of the filter.

In one embodiment, the face(s) through which the optical signal is received and/or reflected has a low-order compensator component to compensate for phase shift in the respective crystals. If the reflective element does not cause a phase shift, low-order the compensator can be omitted. In one embodiment, half wave plate 932 is oriented with an azimuth angle in the range of 0° to −15° (e.g., −6.5°); however, the azimuth angle can be different with appropriate changes to the azimuth angles of one or more other half wave plates.

After passing through half wave plate 932, the optical signal passes through birefringent element 940 back to reflective element 952. Reflective element 952 reflect the optical signal back through birefringent element 940 to reflective element 950. Reflective element 950 reflects the optical signal through half wave plate 934 and birefringent element 940.

In one embodiment, half wave plate 934 is oriented with an azimuth angle in the range of 0° to −15° (e.g., −6.5°); however, the azimuth angle can be different with appropriate changes to the azimuth angles of one or more other half wave plates. The optical signal then passes through birefringent element 940, half wave plate 936 and half wave plate 938. In one embodiment, half wave plates 936 and 938 have azimuth angles of 22.5° and 22.5°, respectively; however, other azimuth angles can also be used.

After passing through half wave plate 938, the optical signal is horizontally polarized. The optical signal is vertically polarized by polarizer 965 and passed to port 902. Port 902 is optically coupled to port 910, for example, by a fiber jumper or other optical coupling device. The optical signal then follows the path described above through the lower deck of the optical device. The horizontally polarized, filtered signal is offset by walk-off crystal 925 to polarizer 960 and port 912.

Figure 10:
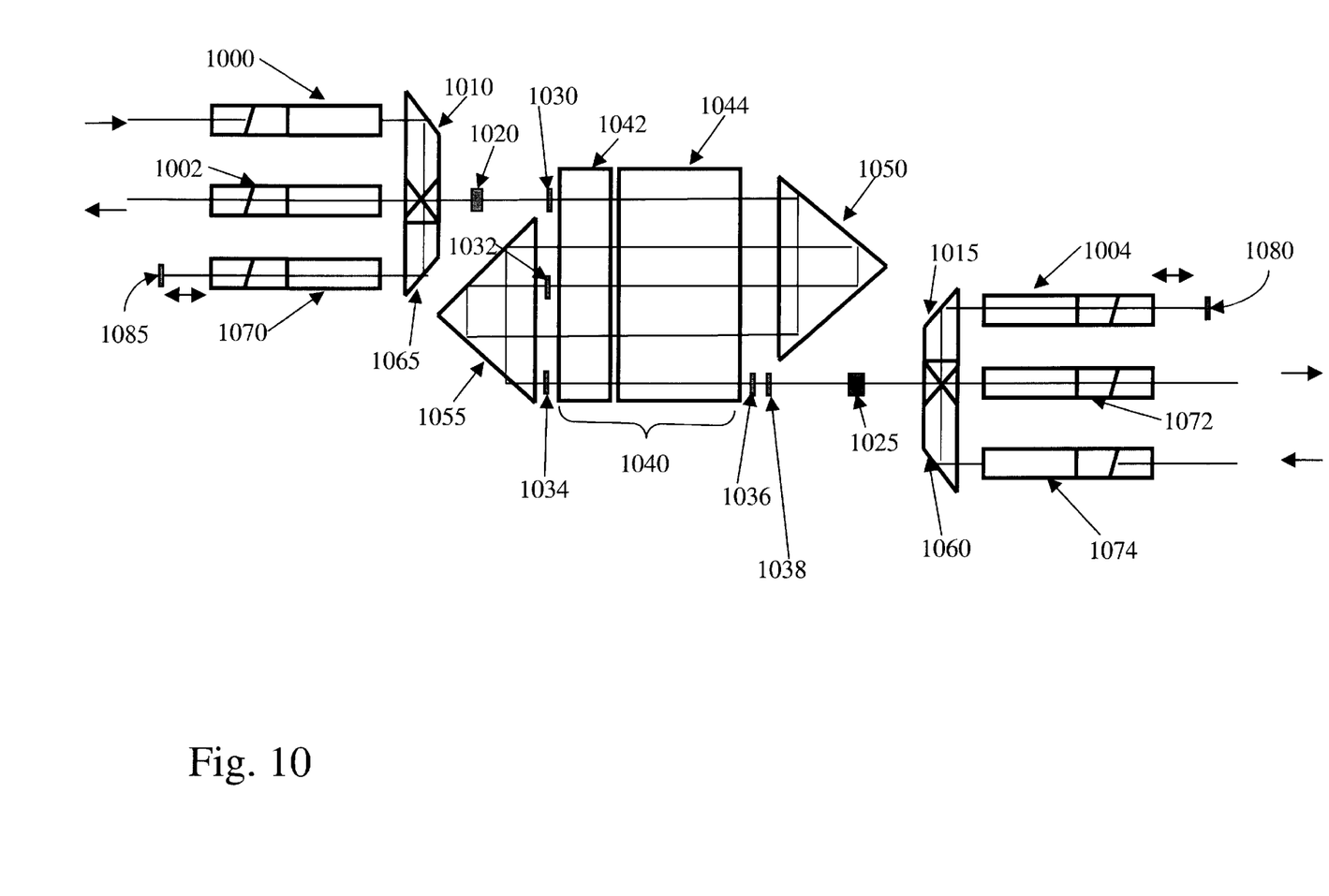
FIG. 10 is a top view of one embodiment of a double-decker optical device configured to operate as two single-pass optical filters.

FIG. 10 is a top view of one embodiment of a double-decker optical device configured to operate as two single-pass optical filters. In general, the top deck operates as a first single-pass filter and the lower deck operates as a second single-pass filter.

In one embodiment, ports 1000, 1002 and 1004 and walk-off crystals 1010 and 1015 are part of the upper deck. Ports 1070, 1072 and 1074 and walk-off crystals 1060 and 1065 are part of the lower deck. For purposes of description, the device of FIG. 10 is described as receiving a set of even channels through port 1000 and a set of odd channels through port 1074; however, either even or odd channels can be received through either port.

Following the optical path for the even channels first, the optical signal is received via port 1000. The signal is offset by walk-off crystal 1010 and directed through Faraday rotator 1020 to half wave plate 1020. In one embodiment, polarizer 1030 provides polarization in the range of 0° to 15° (e.g., 2.6°); however, the polarizations can be different with appropriate changes to the azimuth angles of one or more half wave plates.

After passing through half wave plate 1030, the optical signal is directed to birefringent element 1040. In one embodiment, birefringent element 1040 is composed of crystals 1042 and 1044 that are selected to provide improved thermal stability over a range of operating temperatures as compared to a single birefringent crystal. In one embodiment, crystal 1042 is a $TiO_2$ crystal having a thickness of 2 mm, and crystal 1044 is a $YVO_4$ crystal having a thickness of 9.5 mm. Other birefringent assemblies can also be used, for example, a single crystal can be used if temperature stability is not important, or other two-crystal birefringent assemblies can be used.

After passing through birefringent element 1040, the optical signal is reflected by reflective element 1050. In one embodiment, reflective element 1050 is a 90° reflecting crystal; however, other reflective elements can be used based on, for example, the physical layout of the filter. In one embodiment, the face(s) through which the optical signal is received and/or reflected has a low-order compensator component to compensate for phase shift in the respective crystals. If the reflective element does not cause a phase shift, low-order the compensator can be omitted.

The optical signal is reflected by reflective clement 1050 back through birefringent element 1040. The optical signal is then reflected by reflective element 1055 through half wave plate 1032 and through birefringent element 1040. In one embodiment, reflective element 1055 is a 90° reflecting crystal; however, other reflective elements can be used based on, for example, the physical layout of the filter.

In one embodiment, the face(s) through which the optical signal is received and/or reflected has a low-order compensator component to compensate for phase shift in the respective crystals. If the reflective element does not cause a phase shift, low-order the compensator can be omitted. In one embodiment, half wave plate 1032 is oriented with an azimuth angle in the range of 0° to −15° (e.g., −6.5°); however, the azimuth angle can be different with appropriate changes to the azimuth angles of one or more other half wave plates.

After passing through half wave plate 1032, the optical signal passes through birefringent element 1040 back to reflective element 1050. Reflective element 1050 reflect the optical signal back through birefringent element 1040 to reflective element 1055. Reflective element 1055 reflects the optical signal through half wave plate 934 and birefringent element 1040.

In one embodiment, half wave plate 1034 is oriented with an azimuth angle in the range of 0° to −15° (e.g., −6.5°); however, the azimuth angle can be different with appropriate changes to the azimuth angles of one or more other half wave plates. The optical signal then passes through birefringent element 1040, half wave plate 1036 and half wave plate 1038. In one embodiment, half wave plates 1036 and 1038 have azimuth angles of 22.5° and 22.5°, respectively; however, other azimuth angles can also be used.

The signal then passes through Faraday rotator 1025 and is offset by walk-off crystal 1050 to port 1004. Port 1004 directs the optical signal to quarter wave mirror 1080, which reflects the optical signal back through port 1004 and walk-off crystal 1015 to traverse the optical path described above in the reverse order. After reflecting back to Faraday rotator 1020, the optical signal is passed, by walk-off crystal 1010, to port 1002, which outputs the filtered optical signal.

The odd channels follow an approximately reverse path as described above, except on the lower deck rather than the upper deck. The odd channels are received through port 1074, travel through the Faraday rotators, half wave plates and birefringent element to walk-off crystal 1065. Walk-off crystal 1065 offsets the optical signal to port 1070, which directs the optical signal to quarter wave mirror 1082. Quarter wave mirror 1070 reflects the optical signal back through the optical path described to walk-off crystal 1060. Walk-off crystal 1060 passes the optical signal to port 1072, which outputs the filtered odd channels.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. An apparatus comprising:
   a birefringent element;
   a plurality of ports oriented on at least two decks;
   a plurality of reflective elements to reflect optical signals through the birefringent element; and
   a plurality of half wave plates positioned between one or more of the ports and the birefringent element and between one or more of the reflective elements and the birefringent element;
   wherein when the apparatus is in a first configuration, the apparatus operates as at least one filter, and when the apparatus is in a second configuration, the apparatus operates as at least one interleaver/deinterleaver.

2. The apparatus of claim 1 wherein the birefringent element comprises a single crystal.

3. The apparatus of claim 1 wherein the birefringent element comprises multiple crystals.

4. The apparatus of claim 3 wherein the birefringent element comprises a $TiO_2$ crystal and a $YVO_4$ crystal.

5. The apparatus of claim 1 wherein the reflective elements comprise 90° reflective crystals.

6. The apparatus of claim 1 further comprising a mirror external to one of the ports, the mirror positioned to reflect optical signals back through the port, wherein an optical signal having even and odd channels received through a first port is reflected through the half wave plates and the birefringent element to a Faraday rotator, the optical signal being separated into a first subset of channels and a second subset of channels, and further wherein the first subset of channels is directed to a second port and reflected by the mirror back through the second port and back through the half wave plates and the birefringent element to a third port, the second subset of channels is directed to a fourth port, which is optical coupled to a fifth port, the second subset of channels passing through the half wave plates and the birefringent element to a sixth port.

7. The apparatus of claim 6 wherein the mirror comprises a quarter wave mirror.

8. The apparatus of claim 6 wherein the first subset of channels comprises even channels and the second subset of channels comprises odd channels.

9. The apparatus of claim 6 wherein the first subset of channels comprises odd channels and the second subset of channels comprises even channels.

10. The apparatus of claim 6 wherein the first, second and fourth ports are positioned in a first deck and the third, fifth and sixth ports are positioned in a second deck.

11. The apparatus of claim 1 wherein a first optical signal having even channels and odd channels is received through a first port, the first optical signal to be passed through one or more of the half wave plates and the birefringent element such that a first subset of channels is directed to a second port and a second subset of channels is directed to a third port, and further wherein a second optical channels having even and odd channels is received through a fourth port, the second optical signal to be passed through one or more of the half wave plates and the birefringent element such that a first subset of channels is directed to a fifth port and a second subset of channels is directed to a sixth port.

12. The apparatus of claim 11 wherein the first subset of channels of the first optical signal and the first subset of channels of the second optical signal comprises even channels, and further wherein the second subset of channels from the second optical signal and the second subset of channels of the second optical signal comprises odd channels.

13. The apparatus of claim 11 wherein the first subset of optical channels of the first optical signal and the first subset of optical channels from the second optical signal comprises odd channels and further wherein the second subset of optical channels of the first optical signal and the second subset of optical channels from the second optical signal comprises even channels.

14. The apparatus of claim 11 wherein the first, second and third ports are positioned in a first deck and the fourth, fifth and sixth ports are positioned in a second deck.

15. The apparatus of claim 1 comprising a first port to receive an optical signal having one of a set of even channels and a set of odd channels, the optical signal to be passed through the half wave plates, the birefringent element and a first polarizer to a second port, the second port optically coupled to a third port to pass the optical signal to the third port, the optical signal to be passed through the half wave plates, the birefringent element and a second polarizer to a fourth port.

16. The apparatus of claim 15 wherein the first and second ports are positioned in a first deck and the third and fourth ports are positioned in a second deck.

17. The apparatus of claim 1 comprising a first port to receive a first optical signal having one of a set of even channels and a set of odd channels, the first optical signal to through a first Faraday rotator, the half wave plates, the birefringent element and a second Faraday rotator to a second port, the second port to direct the first optical signal to a first mirror to reflect the first optical signal back through the second port, the second Faraday rotator, the birefringent element, the half wave plates and the first Faraday rotator to a third port, and a fourth port to receive a second optical signal having one of a set of even channels and a set of odd channels, the second optical signal to pass through the second Faraday rotator, the birefringent element, the half wave plates and the first Faraday rotator to a fifth port, the fifth port to direct the second optical signal to a second mirror to reflect the second optical signal back through the first Faraday rotator, the half wave plates, the birefringent element and the second Faraday rotator to a sixth port.

18. The apparatus of claim 17 wherein the first mirror and the second mirror comprise quarter wave mirrors.

19. The apparatus of claim 17 wherein the first, second and third ports are positioned in the first deck and the fourth, fifth and sixth ports are positioned in the second deck.

* * * * *